(12) United States Patent
Freeman

(10) Patent No.: US 11,826,831 B2
(45) Date of Patent: Nov. 28, 2023

(54) METHODS FOR ADDITIVE MANUFACTURING A PART AND PARTS FORMED ACCORDING TO THE METHODS

(71) Applicant: Ford Global Technologies, LLC, Dearborn, MI (US)

(72) Inventor: Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 610 days.

(21) Appl. No.: 16/739,921

(22) Filed: Jan. 10, 2020

(65) Prior Publication Data
US 2021/0213529 A1 Jul. 15, 2021

(51) Int. Cl.
| | | |
|---|---|---|
| B22F 7/06 | (2006.01) | |
| B29C 64/176 | (2017.01) | |
| B29C 64/245 | (2017.01) | |
| B33Y 80/00 | (2015.01) | |
| B33Y 10/00 | (2015.01) | |

(52) U.S. Cl.
CPC ............ *B22F 7/062* (2013.01); *B29C 64/176* (2017.08); *B29C 64/245* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 10,150,247 B2 | 12/2018 | Dudley | |
| 2017/0266890 A1 | 9/2017 | Volk | |
| 2019/0240782 A1* | 8/2019 | Tempco | .................... B22F 7/08 |
| 2020/0238615 A1* | 7/2020 | Staal | ..................... B33Y 40/00 |

FOREIGN PATENT DOCUMENTS

WO 2017051029 3/2017

* cited by examiner

*Primary Examiner* — Colin W. Slifka
(74) *Attorney, Agent, or Firm* — Burris Law, PLLC

(57) ABSTRACT

A method of additively manufacturing a part includes placing a standardized blank in a recess within a baseplate, forming the part by successively applying material to the standardized blank, and removing the standardized blank with the applied material from the recess. The successively applied material is at least one of mechanically secured to the standardized blank and chemically secured to the standardized blank such that standardized blank is a feature of the part. The material can be successively applied to the insert by melting and solidifying a metal material onto the standardized blank using at least one of extrusion, selective laser melting, binder jetting, material jetting, directed energy deposition, and sheet lamination, and the standardized blank manages heat during successively applying material to the standardized blank.

15 Claims, 6 Drawing Sheets

METHODS FOR ADDITIVE MANUFACTURING A PART AND PARTS FORMED ACCORDING TO THE METHODS

FIELD

The present disclosure relates to additive manufacturing of parts.

BACKGROUND

The statements in this section merely provide background information related to the present disclosure and may not constitute prior art.

Additive manufacturing forms parts layer-by-layer on a baseplate. For example, selective laser melting (SLM) is used to make parts from metal powders by melting successive layers of metal powder that solidify into solid metal layers bonded to each other thereby forming metal parts one layer at a time. At least the first layer of solidified metal powder is bonded to a baseplate and the metal parts must be removed from the baseplate using methods or techniques such as sawing and electric discharge machining (EDM) wire cutting, among others. However, removal of the metal parts from the baseplate requires additional time and expense.

These issues, among other issues related to additive manufacturing of parts are addressed in the present disclosure.

SUMMARY

This section provides a general summary of the disclosure and is not a comprehensive disclosure of its full scope or all of its features.

In one form of the present disclosure, a method of additively manufacturing a part includes placing a standardized blank in a recess within a baseplate, forming the part by successively applying material to the standardized blank, and removing the standardized blank with the applied material from the recess. The successively applying material is at least one of mechanically secured to the standardized blank and chemically secured to the standardized blank such that standardized blank is a feature of the part. In some variations the material is successively applied to the insert by melting and solidifying a metal material onto the standardized blank using at least one of extrusion, selective laser melting, binder jetting, material jetting, directed energy deposition, and sheet lamination. In such variations the metal material is chemically secured to the standardized blank with a metallurgical bond between the applied metal material and the standardized blank. Also, the standardized blank manages heat during successively applying material to the standardized blank.

In at least one variation the standardized blank is attached to the baseplate. For example, in some variations the standardized blank is attached to the baseplate with an interference fit between the standardized blank and the recess, with at least one spring biasing element, with at least one threaded member and combinations thereof.

In some variations the method includes placing a plurality of standardized blanks into a plurality of recesses in the baseplate, forming a plurality of parts by successively applying material to the plurality of standardized blanks, and removing the plurality of standardized blanks with the applied material from the plurality of recesses. The successively applied material is at least one of mechanically secured to the plurality of standardized blanks and chemically secured to the plurality of standardized blanks such that each standardized blank is a feature of each of the plurality of parts. In at least one variation the plurality of parts includes a first set of parts and a second set of parts with a different shape than the first set of parts and the plurality of standardized blanks have the same shape.

In some variations the material is applied successively to the plurality of standardized blanks by melting and solidifying a metal material onto the plurality of standardized blanks. In such variations the plurality of standardized blanks manage heat generated during melting and solidifying the metal material onto the plurality of standardized blanks.

In at least one variation the plurality of standardized blanks are attached to the baseplate with an interference fit, a plurality of biasing elements, a plurality of threaded members, and combinations thereof.

In another form of the present disclosure, additive manufactured parts formed by the method of placing a plurality of standardized blanks into a plurality of recesses within a baseplate, successively applying material to the plurality of standardized blanks, and removing the plurality of standardized blanks with the applied material from the plurality of recesses. The successively applied material is at least one of mechanically secured to the plurality of standardized blanks and chemically secured to the plurality of standardized blanks such that a plurality of additive manufactured parts is formed with each of the plurality of standardized blanks being a feature of each the plurality of additive manufactured parts. In some variations the plurality of standardized blanks have the same shape and the plurality of additive manufactured parts incudes a first set of additive manufactured parts and a second set of additive manufactured parts with a different shape than the first set of additive manufactured parts. In at least one variation the standardized blank is a metal standardized blank and the parts are metal parts chemically secured to the metal standardized blank with a metallurgical bond. In such a variation the metal standardized blank manages heat during and after successively applying the material to the metal standardized blank. In some variations the standardized blanks are attached to the baseplate using at least one of an interference fit between the standardized blank and the recess, a ball-nose spring plunger and a threaded element threadingly engaged with the baseplate and in contact with the standardized blank.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
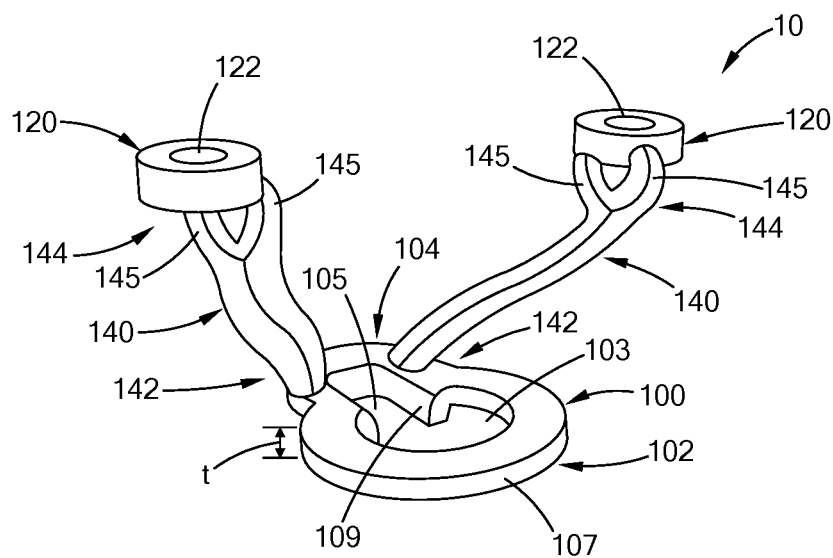
FIG. 2 is an isolated perspective view of the additive manufactured part in FIG. 1.
Figure 3A:
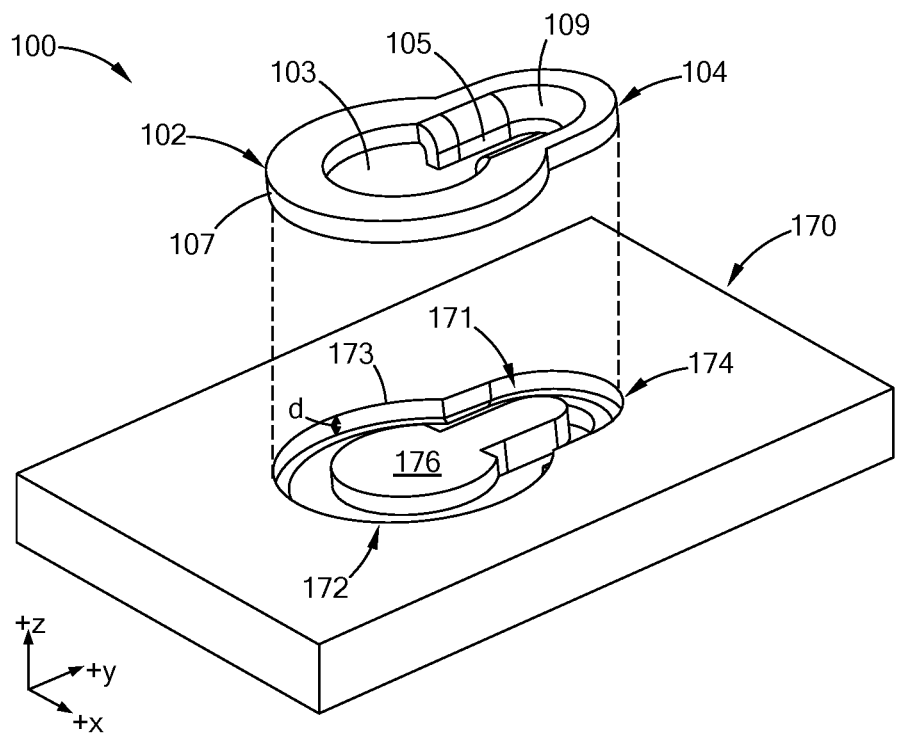
Figure 3B:
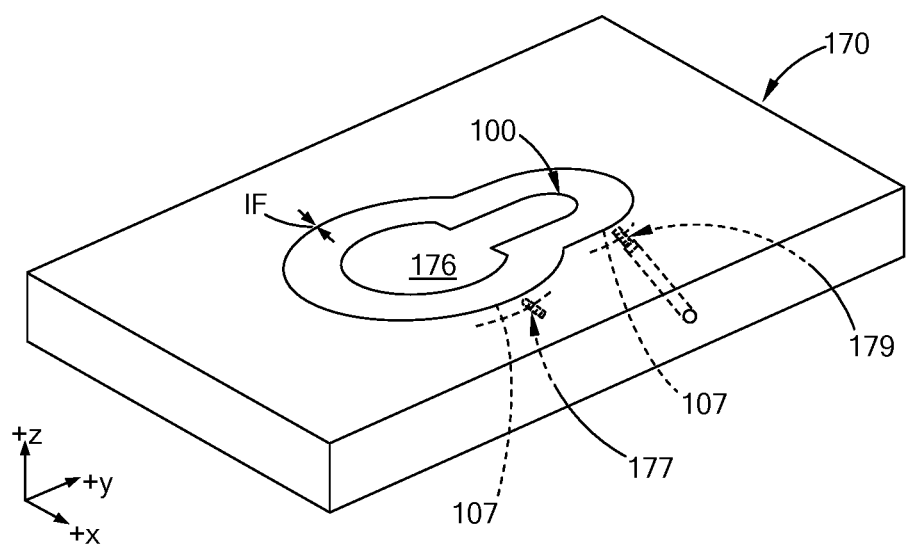
Figure 3C:
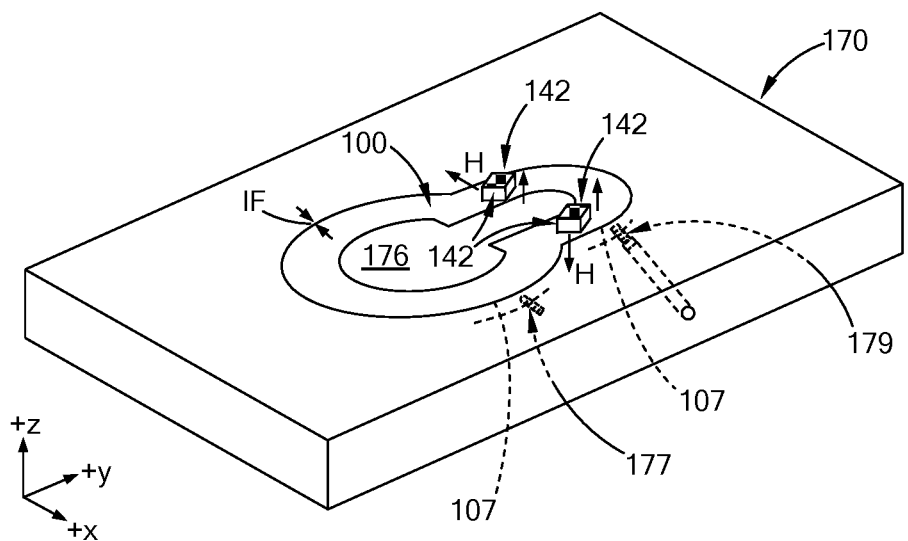
Figure 3D:
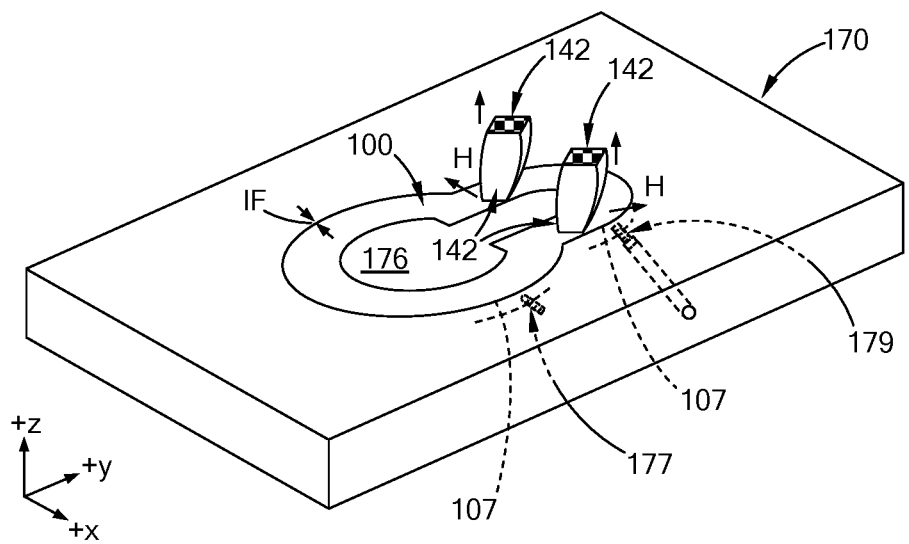
Figures 4A, 4B, 4C:
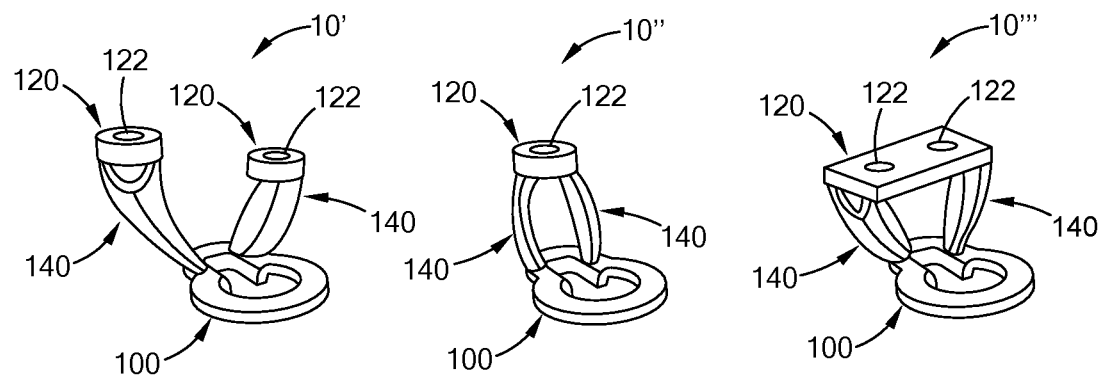
Figure 5:
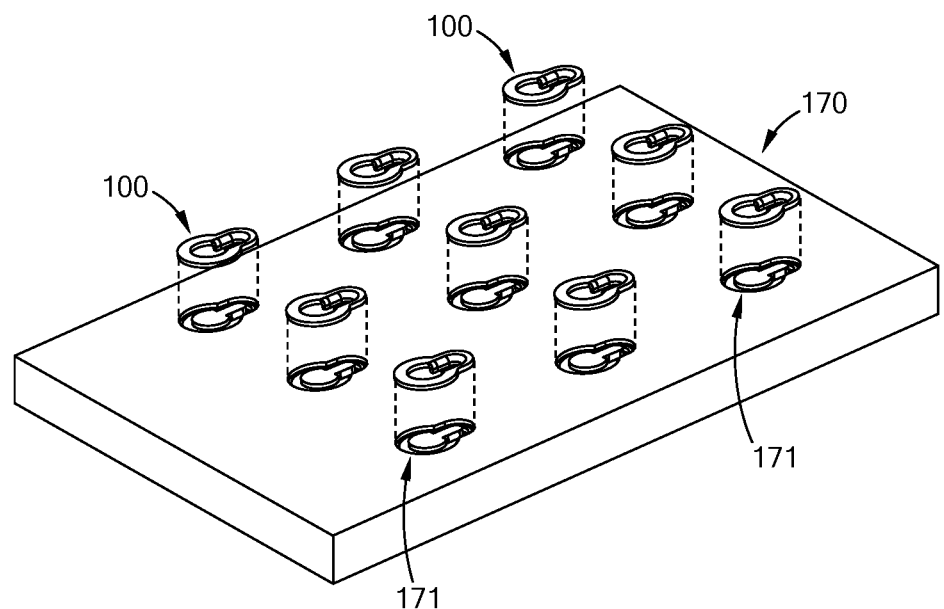
Figure 6:
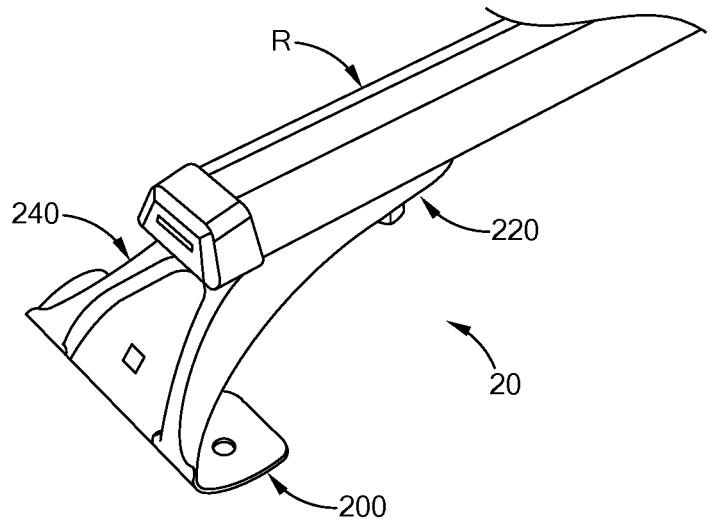
Figure 7:
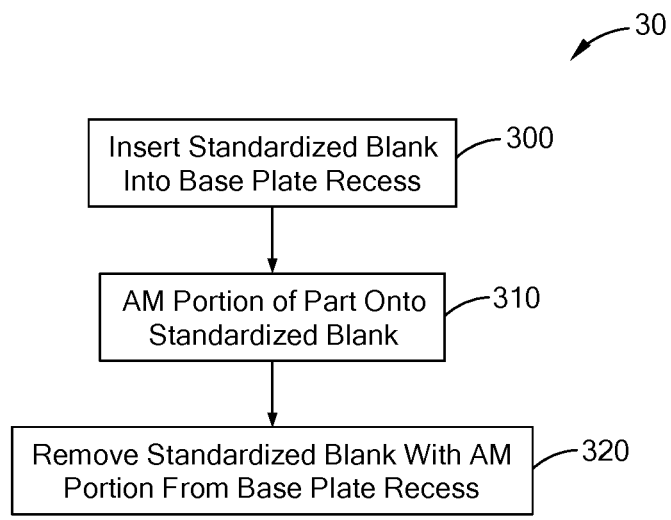
Figure 8:
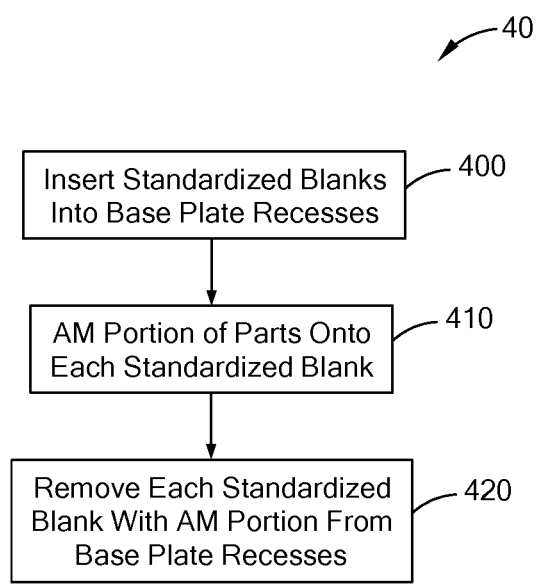

FIGS. 3A-3D show a method for manufacturing the additive manufactured part in FIG. 2 where: FIG. 3A shows a standardized blank being inserted into a recess within a baseplate according to the teachings of the present disclosure; FIG. 3B shows the standardized blank inserted and held within the recess in FIG. 3A according to the teachings of the present disclosure; and FIGS. 3C-3D show legs of the part in FIG. 2 being made by additive manufacturing according to the teachings of the present disclosure;

FIGS. 4A-4C show the standardized blank in FIG. 3A used for additive manufactured parts having different shapes and configurations according to the teachings of the present disclosure;

FIG. 5 shows a plurality of standardized blanks being inserted into a plurality of recesses within a baseplate according to the teachings of the present disclosure;

FIG. 6 is a perspective of an additive manufactured part according to another form of the present disclosure;

FIG. 7 is a flowchart for a method for manufacturing an additive manufactured part according to one form of the present disclosure; and FIG. 8 is a flowchart for a method for manufacturing a plurality of additive manufactured parts according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
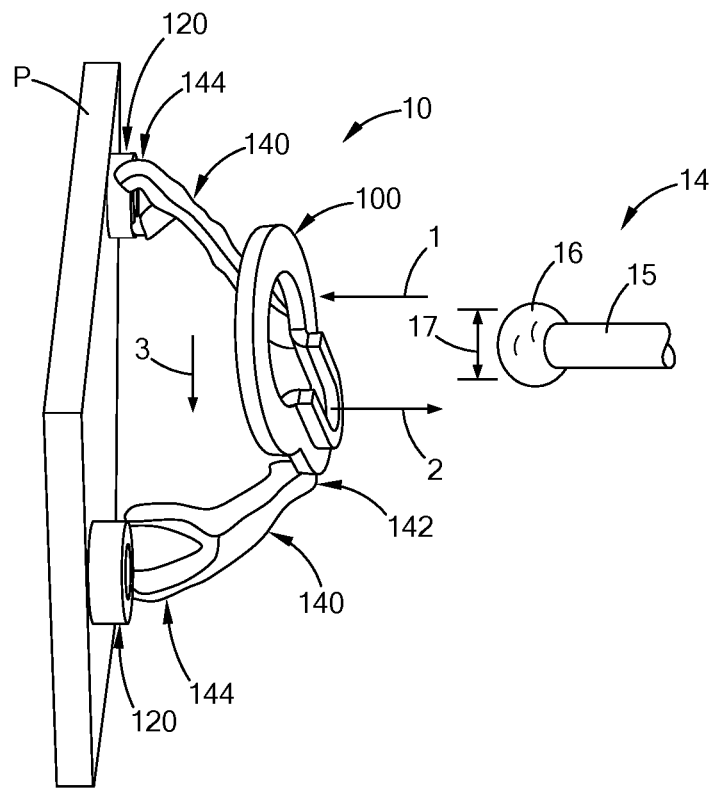
FIG. 1 is a perspective view of an additive manufactured part according to one form of the present disclosure secured to a vehicle panel.

Referring to FIGS. 1 and 2, a hybrid additive manufactured (AM) part 10 attached to a panel P, e.g., a vehicle panel, according to the teachings of the present disclosure is shown in FIG. 1 and an isolated view of the hybrid AM part 10 is shown in FIG. 2. The hybrid AM part 10 (also referred to herein simply as "AM part") includes a standardized blank portion 100 (also referred to herein simply as a "standardized blank"), a pair of attachment portions 120, and a pair of AM legs 140 attached to and extending between the standardized blank 100 and the pair of attachment portions 120. The pair of AM legs 140 are mechanically secured and/or chemically secured to the standardized blank 100 and/or the pair of attachment portions 120.

In the example shown in FIGS. 1 and 2, each of the pair of legs 140 has a first end 142 attached to the standardized blank 100 and a second end 144 attached to an attachment portion 120. In some variations, the pair of legs 140 have two or more attachment sections 145 at the second end 144 and it should be understood that the first end 142 of the one or both of the pair of legs 140 can include two or more attachment sections. That is, with the ability of additive manufacturing to produce the pair of legs 140 (and other components disclosed herein) layer-by-layer, the shape and number of attachment sections can vary such that the strength, ductility, weight of the pair of legs can be enhanced. In addition, and although the pair of legs 140 are shown in the figures as solid legs, it should be understood that the pair of legs 140 (and other components disclosed herein) can be designed and made with other structures such as hollow legs, porous legs, and biomimetic structured legs, among others.

The attachment portions 120 provide attachment of the AM part 10 to the panel P, e.g. using attachment components such as threaded fasteners, rivets, adhesives, welds, and clips, among others (not shown). In the example shown in FIGS. 1 and 2, the standardized blank portion 100 includes a large end 102 with a large aperture 103 and a small end 104 with a small aperture 105. An outer wall 107 extends around the large end 102 and the small end 104, and an inner wall 109 extends within or bounds (defines) the large aperture 103 and the small aperture 105. The large aperture 103 is in communication with the small aperture 105 such that a component 14, e.g., a rod 15 with an enlarged end 16 attached to the rod 15, can be attached to the panel P via the AM part 10. In the example shown in FIG. 1, the enlarged end 16 is dimensioned such that it can move or slide through the large aperture 103 in a direction indicated by arrow 1 but cannot move or slide through the small aperture 105 in a direction a direction indicated by arrow 2. That is, the enlarged end 16 has an outer dimension 17 that fits or slides through the large aperture 103 but does not fit or slide through the small aperture 105. The rod 15 has an outer dimension (not labeled) that fits or slides within the small aperture 105 and after the enlarged end 16 slides through the large aperture 103 in the direction indicated by arrow 1, the enlarged end 16 and the rod 15 slide in a direction indicated by arrow 3 such that the rod 15 and the enlarged end 16 are secured in the small aperture 105 and thereby attached to the AM part 10 and panel P. It should be understood that the component 14 can be removed from the AM part 10 by sliding the rod 15 and enlarged end 16 in a direction opposite to arrow 3 until the enlarged end 16 can slide through the large aperture 103 in the direction indicated by the arrow 2. In at least one variation of the present disclosure, the AM part 10 is part of a divider net or divider gate that provides a boundary between a rear portion of a vehicle (e.g., the rear portion of a sport utility vehicle (SUV)) and a rear seat of the vehicle. Such divider nets or gates can be used to assist in keeping a pet (e.g., a dog) in the rear portion of the vehicle.

Referring now to FIGS. 3A-3D, a method of making the AM part 10 is shown. Particularly, the standardized blank 100 of the AM part 10 is inserted into a recess 171 of a baseplate 170 as shown in FIGS. 3A and 3B, and the pair of legs 140 are AM onto the standardized blank 100 as shown in FIGS. 3C and 3D such that the pair of legs are mechanically secured to the standardized blank 100 and/or chemically secured to the standardized blank 100. It should be understood that in some variations the standardized blank 100 is a pre-fabricated or pre-manufactured part that is manufactured according to known conventional manufacturing methods and techniques including stamping, forging, machining, rolling, and combinations thereof, among others. In other variations the standardized blank 100 is a pre-fabricated or pre-manufactured part that is manufactured using additive manufacturing. It should also be understood, and as described in greater detail below, the standardized blank 100 is "standardized" in that the same standardized blank 100 (i.e., a plurality of standardized blanks having the same shape and size) can be used to manufacture AM parts having different shapes and sizes. Non-limiting examples include a standardized blank used in the manufacture of AM parts for a left-hand side of a vehicle versus a righthand side of the vehicle, AM parts for a first row seat versus a second row seat or third row seat of a vehicle, AM parts for vehicles with a moon roof versus vehicles without a moon roof, AM parts for sedan vehicles versus SUV vehicles, among others.

Referring specifically to FIG. 3A, the standardized blank in the recess 171 is in direct contact with the baseplate 170. The recess 171 is complimentary in shape with the standardized blank 100 and has an outer wall 173 that extends along a large recess portion 172 and a small recess portion 174. The outer wall 173 has a depth 'd' that is generally equal to a thickness 't' of the standardized blank portion 100

(FIG. 2). The baseplate 170 includes an insert portion 176 complimentary in shape with the large aperture 103 and the small aperture 105 of the standardized blank portion 100. As shown in FIG. 3B, in some variations of the present disclosure the standardized blank 100 is attached to the baseplate 170 using an interference fit 'IF' between the standardized blank 100 and the recess 171, one or more spring biasing elements 177, and/or one or more threaded members 179. It should be understood that the interference fit (IF in figures), the one or more spring biasing elements 177, and the one or more threaded members 179 are used to enhance contact between the standardized blank 100 and the baseplate 170 such that the standardized blank 100 does not move during additive manufacturing of the pair of legs 140 onto the baseplate 170. In some variations of the present disclosure, attachment of the standardized blank 100 to the baseplate 170 as described above increases or enhances heat transfer from the standardized blank 100 to the baseplate 170 during additive manufacturing of the pair of legs 140. Particularly, during additive manufacturing of the pair of legs 140 from metal powder as shown in FIG. 3C, heat 'H' is generated during melting of each layer of metal powder and the heat flows from the pair of legs 140 being additive manufactured to the standardized blank 100, and from the standardized blank 100 to the baseplate 170. Accordingly, the standardized blank portion 100 manages heat during the additive manufacturing of the AM part 10.

The additive manufacturing of the pair of legs 140 continues as shown in FIG. 3D until reaching the position of the pair of attachment portions 120 which may be AM onto the pair of legs 140, or in the alternative, the pair of attachment portions may be pre-fabricated and joined to the pair of legs 140. In some variations, the pair of attachment portions 120 are pre-fabricated using conventional manufacturing techniques, while in other variations the pair of attachment portions 120 are pre-fabricated using additive manufacturing. Accordingly, in some variations one or both of the attachment portions 120 are standardized attachment sections. It should be understood that the additive manufacturing process can include extrusion, selective laser melting, binder jetting, material jetting, directed energy deposition, and/or sheet lamination as listed and disclosed in ASTM F42.

After the additive manufacturing of the pair of legs 140 is completed, and in some variations, after the manufacture of the AM part 10 is completed, the standardized blank portion 100 with the pair of legs 140 is removed or separated from the baseplate 170 by removing the standardized blank portion 100 from the recess 171. Accordingly, the AM part 10 is removed from the baseplate 170 without using techniques such as sawing and EDM wire cutting, among others, and the standardized blank 100 is a feature of the AM part 10.

As noted above, in some variations of the present disclosure the standardized blank 100 is used to manufacture AM parts having different shapes and sizes with non-limiting examples shown in FIGS. 4A-4C. Particularly, FIG. 4A shows an AM Part 10' with pair of legs 140 shorter (z direction) than the pair of legs 140 of the AM part 10 shown in FIG. 2, FIG. 4B shows an AM Part 10" with only one attachment portion 120 having only one attachment aperture 122, and FIG. 4C shows an AM part 10''' with only one attachment portion 120 having two attachment apertures 122. Accordingly, FIGS. 4A-4C show that the same standardized blank 100 is used to form AM parts having different shapes and sizes. It should be understood that such AM parts can be used for different model vehicles and provide the same function. That is, the AM part 10' shown in FIG. 4A can be used in one model of a vehicle, the AM part 10" shown in FIG. 4B can be used in another model of the vehicle, and the AM part 10''' shown in FIG. 4C can used in yet another model of the vehicle, while all of the AM parts 10, 10', 10" and 10''' use the same standardized plate 100. Accordingly, the number of different parts needed for different models of the AM part 10 is reduced, thereby reducing inventory for parts used to from different AM parts and reducing costs for manufacturing different AM parts.

Referring now to FIG. 5, in some variations of the present disclosure a plurality of AM parts 10 are formed by inserting a plurality of standardized blanks 100 into a plurality recesses 171. In such variations a pair of legs 140 is AM on each standardized blank 100 (FIGS. 3C-3D) such that the plurality of AM parts 10 are formed using a single AM operation. In some variations of the present disclosure all of the AM parts formed using the single AM operation have the same size and shape, while in other variations, the AM parts formed using the single AM operation have different sizes and shapes as described above with reference to FIGS. 4A-4C. It should be understood that each of the AM parts is removed or separated from the baseplate 10 by removing each standardized blank 100 from the plurality of recesses 171 without using techniques such as sawing and EDM wire cutting, among others. It should also be understood that removing a plurality of AM parts from a baseplate 10 according to the teachings of the present disclosure reduces time, labor and costs associated with the production of such AM parts.

Referring now to FIG. 6, another example of an AM part 20 according to the teachings of the present disclosure is shown. The AM part 20 is in the form of mounting bracket 20 for a rail R of a vehicle cargo roof rack and includes a standardized blank portion 200, a leg 240 and a mounting bracket 220. Similar to the manufacture of the AM part 10 described above, the standardized blank portion 200 is inserted within a recess (not shown) of a baseplate (not shown) and the leg 240 is AM onto the standardized blank portion 200. The mounting bracket 220 is attached to the leg 240, e.g., by additive manufacturing the mounting bracket 220 on the leg 240 or by attaching (e.g., welding) a pre-fabricated mounting bracket 220 onto the leg 240.

Referring now to FIG. 7, a flowchart for a method 30 of additive manufacturing a part is shown. The method 30 includes inserting a standardized blank into a baseplate recess at 300 and additive manufacturing a portion of the part onto the standardized blank at 310 such that the standardized blank is a feature of the AM part. After the AM portion has been completed, the standardized blank with the AM portion is removed or separated from the baseplate by removing the standardized blank from the baseplate recess at 320.

Referring now to FIG. 8, a flowchart for a method 40 of additive manufacturing a plurality of parts is shown. The method 40 includes inserting a plurality standardized blanks into a plurality of baseplate recesses at 400 and additive manufacturing a portion of the part onto each of the standardized blanks at 410 such that a standardized blank is a feature of each AM part. After the AM portions have been completed, the standardized blanks with the AM portions are removed or separated from the baseplate by removing the standardized blanks from the baseplate recesses at 420. It should be understood that all of the AM parts formed have the same size and shape, or in the alternative, the AM parts have different sizes and shapes as described above with reference to FIGS. 4A-4C.

While the examples shown in the figures represent a divider net bracket and a roof rack bracket, it should be understood that other parts are suitable for such hybrid AM parts. Non-limiting examples of such hybrid AM parts include seat-belt retractors, door strikers, grab handles, adjustable D-rings, cell phone holders, speakers and speaker housings, interior lighting housings, exterior lighting housings, door latches, liftgate lift cylinders, side door hinges, liftgate hinges, liftgate latches, fuel pipes, fuel lines, HVAC cooling lines and fuel tanks, among others.

It should be understood that from the teachings of the present disclosure a method for manufacturing a hybrid AM part is provided. The method includes using a standardized blank as a foundation or base for additive manufacturing a portion of the part thereon and the standardized blank is integral with or is a feature of the hybrid AM part. The standardized blank is held or attached to a baseplate using a recess in the baseplate that is complementary is size and shape with the standardized blank. Also, the standardized blank manages heat during additive manufacturing of the AM portion. Using the standardized blank reduces the cost and inventory for a given part and requires no tooling investment for different size and shaped parts, no need to retain tooling for service of such parts, and provides more flexibility in the manufacture of such parts.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of additively manufacturing a part, the method comprising:
   placing a standardized blank in a recess within a baseplate;
   forming the part by successively applying material to the standardized blank, wherein the material is at least one of mechanically secured to the standardized blank and chemically secured to the standardized blank; and
   removing the standardized blank with the applied material from the recess, wherein the standardized blank is a feature of the part.

2. The method according to claim 1, wherein the material is successively applied to the standardized blank by melting and solidifying a metal material onto the standardized blank using at least one of extrusion, selective laser melting, binder jetting, material jetting, directed energy deposition, and sheet lamination.

3. The method according to claim 2, wherein the metal material is chemically secured to the standardized blank with a metallurgical bond between the applied metal material and the standardized blank.

4. The method according to claim 2, wherein the standardized blank manages heat during successively applying material to the standardized blank.

5. The method according to claim 1 further comprising attaching the standardized blank to the baseplate.

6. The method according to claim 5, wherein the standardized blank is attached to the baseplate with an interference fit between the standardized blank and the recess.

7. The method according to claim 5, wherein the standardized blank is attached to the baseplate with at least one spring biasing element.

8. The method according to claim 5, wherein the standardized blank is attached to the baseplate with at least one threaded member.

9. The method according to claim 1 further comprising:
   placing a plurality of standardized blanks into a plurality of recesses in the baseplate;
   forming a plurality of parts by successively applying material to the plurality of standardized blanks, wherein the material is at least one of mechanically secured to the plurality of standardized blanks and chemically secured to the plurality of standardized blanks;
   securing a plurality of pre-fabricated attachment portions to the applied material of the plurality of parts; and
   removing the plurality of standardized blanks with the applied material from the plurality of recesses, wherein each standardized blank is a feature of each of the plurality of parts.

10. The method according to claim 9, wherein the plurality of parts comprises a first set of parts and a second set of parts with a different shape than the first set of parts.

11. The method according to claim 10, wherein the plurality of standardized blanks have the same shape.

12. The method according to claim 9, wherein the material is applied successively to the plurality of standardized blanks by melting and solidifying a metal material onto the plurality of standardized blanks.

13. The method according to claim 12, wherein the plurality of standardized blanks manage heat generated during melting and solidifying the metal material onto the plurality of standardized blanks.

14. The method according to claim 9, wherein the plurality of standardized blanks are attached to the baseplate with an interference fit.

15. The method according to claim 9, wherein the plurality of standardized blanks are attached to the baseplate with a plurality of biasing elements.

* * * * *